United States Patent [19]

Nakanishi et al.

[11] Patent Number: 4,722,078
[45] Date of Patent: Jan. 26, 1988

[54] DISC PLAYER

[75] Inventors: Hiromi Nakanishi; Masahiro Nakamura, both of Yokohama, Japan

[73] Assignee: Kabushiki Kaisha Toshiba, Kawasaki, Japan

[21] Appl. No.: 780,797

[22] Filed: Sep. 27, 1985

[30] Foreign Application Priority Data

Sep. 28, 1984 [JP] Japan .................................. 59-203582

[51] Int. Cl.[4] .............................................. G11B 17/22
[52] U.S. Cl. ........................................ 369/39; 369/34; 369/178; 369/197
[58] Field of Search ................... 369/75.2, 34, 37, 39, 369/178, 197

[56] References Cited

U.S. PATENT DOCUMENTS

| | | | |
|---|---|---|---|
| 3,097,850 | 7/1963 | Curci | 369/197 |
| 3,131,936 | 5/1964 | Hagen | 369/39 |
| 4,561,078 | 12/1985 | Nakayama | 369/36 |
| 4,564,930 | 1/1986 | Funabashi et al. | 369/75.2 |
| 4,566,087 | 1/1986 | Kraft | 369/36 |

FOREIGN PATENT DOCUMENTS

0104757  6/1984  Japan .................................. 369/191

*Primary Examiner*—Steven L. Stephan
*Attorney, Agent, or Firm*—Finnegan, Henderson, Farabow, Garrett & Dunner

[57]  ABSTRACT

A disc player for playing compact audio discs includes a plurality of horizontally spaced disc compartments each including a disc tray for holding a disc horizontally and a disc playback module horizontally movable between and alignable with the disc compartments for playing the discs held in the disc trays. Each disc tray is independently extendable from or retractable into its respective disc compartment for loading and unloading discs in the disc compartment.

10 Claims, 11 Drawing Figures

DISC PLAYER

BACKGROUND OF THE INVENTION

1. Field of the Invention

The present invention relates to disc players that are suitable for playing, for example, optical compact discs (CDs) and, more particularly, to control systems for disc players.

2. Description of Related Art

Recently, in the field of audio equipment, digital audio disc playback systems utilizing pulse code modulation (PCM) technology to play back sound as faithfully as possible have been development. Of these systems, playback systems employing CDs have become especially popular.

The CD conventionally used in a digital audio disc playback system is made from a transparent resin and has a diameter of approximately 12 cm and a thickness of approximately 1.2 mm. The CD has a thin metal film deposited on at least one disc surface, and pits or depressions are formed in the thin metal film. The pits or depressions produce light reflectivities that are different from the reflectivity of the non-pitted portions of the metal film and that correspond to 1 or 0 of digitized data. When a signal is read out from a CD, the disc is rotated at a variable rotation speed between 200 and 500 rpm so that an optical pickup incorporating a semiconductor laser or photoelectric transducing device tracks the information storage area of the rotating CD with constant linear velocity while moving radially from the center portions toward the outer portions.

A CD stores such a large quantity of information that a single side can provide approximately one hour of stereophonic music. A CD is far superior to a conventional analog phonograph record in sound quality, information storage density, and applicability to sophisticated control facilities.

Conventional CD players intended, for example, for home use, however, do not possess adequate operating flexibility to satisfy the demand for sophisticated control facilities. For example, conventional CD players provide only one disc compartment with one disc playback unit so that, each time a CD is finished playing, the playback operation has to be interrupted by manually exchanging a new disc. Thus, neither continuous and sequential playback of a plurality of discs, nor selective playback of portions of a plurality of discs at will is possible with conventional CD players.

Although such features presently are finding application in multi-disc players for commerical use, for example, in jukeboxes, the techniques presently being considered are strictly for this type of use only and cannot meet the non-commercial demand for greater operating flexibility referred to above.

An object of the present invention is to provide a disc player capable of holding simultaneously a plurality of discs.

Another object of the present invention is to provide a disc player that permits continuous and sequential playback of a plurality of discs and selective playback of portions of a plurality of discs at the will of the user.

A further object of the present invention is to provide a disc player with sophisticated control facilities conveniently operable by the user.

Additional objects and advantages of the present invention will be set forth in part in the description that follows and in part will be obvious from that description or can be learned by practice of the invention. The objects and advantages of the invention can be realized and obtained by the apparatus particularly pointed out in the appended claims.

SUMMARY OF THE INVENTION

The present invention overcomes the problem of prior art disc players by providing a disc player having a plurality of disc compartments, each of which can hold a disc, and a disc playback module movable between the disc compartments for playing any of the discs held in the disc compartments.

To overcome the problems of the prior art and in accordance with the purpose of the invention, as embodied and broadly described herein, the disc player of the present invention comprises a plurality of horizontally spaced disc compartments each including means for holding a disc horizontally in the disc compartment; a disc playback module horizontally movable between and alignable with the disc compartments for playing a disc held in any of the disc compartments; and playback module transport means for transporting the disc playback module horizontally between the disc compartments and for aligning the disc playback module with any of the disc compartments.

Preferably, the disc player further comprises means for independently extending and retracting the disc holding means out of and into the disc compartments for loading and unloading discs in the disc compartments; playback module lifting means for raising the disc playback module to a playing position where the disc playback module is able to play a disc held in any of the disc compartments and for lowering the playback module from the playing position to a position where the playback module can move horizontally between the disc compartments; and clamping means for clamping a disc to the disc playback module in response to the disc playback module being raised by the playback module lifting means.

The accompanying drawings, which are incorporated in and which constitute a part of this specification, illustrate at least one embodiment of the invention and, together with the description, explain the principles of the invention.

DESCRIPTION OF THE PREFERRED EMBODIMENT

Reference now will be made in detail to the presently preferred embodiments of the invention, examples of which are illustrated in the accompanying drawings. Throughout the drawings, like reference numerals and letters are used to designate like or equivalent elements for the sake of simplicity of explanation.

Figure 1:
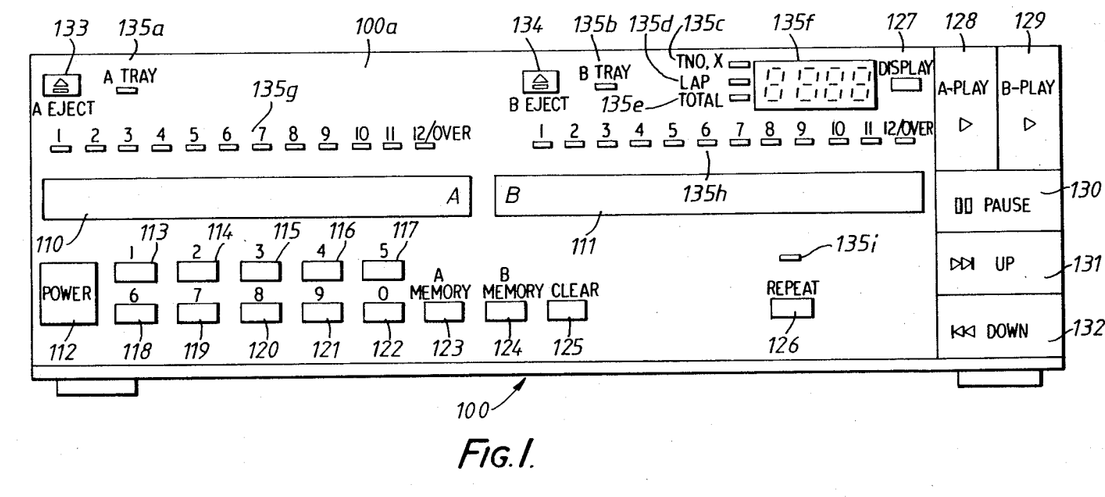
FIG. 1 is a front external view of a CD playback deck according to the present invention having two disc compartments.

FIG. 1 shows a front exterior view of a dual-disc CD player. The dual-disc CD player makes possible the selective playback of two discs loaded respectively in A and B disc compartments 110, 111 in a sequence that can be chosen by the user at will. A and B disc compartments 110, 111 are aligned horizontally to each other at the left and right of the center of cabinet 100. Two disc trays that will be described below respectively are accommodated in A and B disc compartments 110, 111. The disc trays can be independently extended out of and retracted into the front of cabinet 100 through operation of A and B EJECT keys 133, 134 provided on a front panel 100a of cabinet 100.

Front panel 100a includes, below A disc compartment 110, POWER key 112 for switching power on and off, number keys 113-122 numbered 1 through 9 and 0, and A-MEMORY key 123. B-MEMORY key 124, CLEAR key 125, REPEAT key 126, and REPEAT indicator 135i are provided below B disc compartment 111. Front panel 100a further includes, above B disc compartment 111, above-mentioned B EJECT key 134, B-TRAY indicator 135b, track number (TNO, X) indicator 135c, lap time (LAP) indicator 135d, total recording time (TOTAL) indicator 135e, 4-digit track number/time indicator 135f, B track number indicators 135h, and display select (DISPLAY) key 127. Above-mentioned A EJECT key 133, A-TRAY indicator 135a, and A track number indicators 135g are provided above A disc compartment 110. In addition, front panel 100a of cabinet 100 includes, at its right end, A and B playback keys (A-PLAY, B-PLAY) 128, 129, PAUSE key 130, UP key 131, and DOWN key 132.

The keys and indicators mentioned above are connected to a control circuit (not shown) enclosed by cabinet 100. Commands to the control circuit for each function are entered by operation of the keys, the indicators light up on receipt of control signals from the control circuit, and each mechanism is driven and controlled as explained below.

A brief explanation follows of the working of the dual CD player described above. First, when EJECT keys 133 or 134 are operated, the disc tray (described below) in the corresponding A or B disc compartment 110 or 111 is extended out of or retracted into cabinet 100 independently, by means of a transport mechanism that will be described below, in response to the disc tray in the respective disc compartment 110 or 111 having been retracted or extended previously. To load, for example, the A compartment, the user manually places a disc on the A disc tray in extended A disc compartment 100 and pushes A EJECT key 133 to retract the A disc tray into cabinet 100. When A-PLAY key 128 is operated, the disc playback module (which is located underneath A and B disc compartments 110, 111 and which is provided with an optical pick-up for reading the disc, a mechanism for driving the pickup, and a disc drive motor, a turntable, etc.) moves upward to engage the disc in the A disc tray. At the same time, a clamping mechanism on the A side moves down to press the disc onto the turntable. From this point on, the data recorded on the disc are read and processed in a conventional manner. If, with the deck in this state, a disc is placed on the B tray and the B-PLAY key 129 operated, playback of the disc on the A side is stopped immediately, the A-side clamping mechanism moves up to release the disc in the A disc tray, and the disc playback module moves down simultaneously to disengage from the disc in the A disc tray. The disc playback drive module then moves laterally to a position beneath the B tray and moves up to engage the disc in the B disc tray. At the same time, the B-side clamping mechanism moves down to press the disc that has been placed on the B disc tray on to the turntable, and playback begins in the same way as on the A side.

The following are important features of the dual CD player shown in the accompanying drawings and described below: the facility for independent transport of the A and B trays out of and into cabinet 100; the ability of the disc playback module to move laterally from the A side to the B side, and vice versa; the means by which the disc playback module is aligned when it moves between the A and B sides; the ability of the disc playback module to move up and down to engage and disengage a disc in a disc tray; and the movement up and down of the clamp simultaneously with the corresponding oppositely directed movement of the disc playback module.

Figure 2:
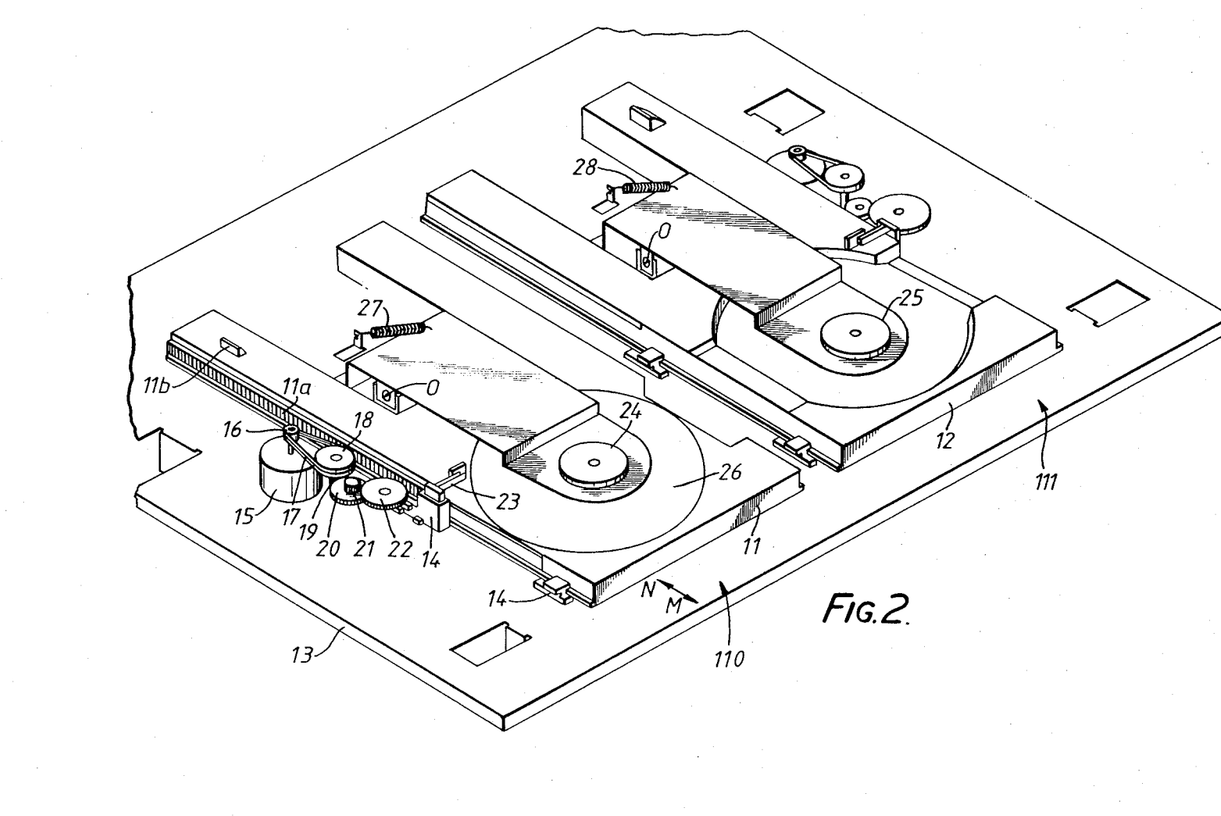
FIG. 2 is a perspective view showing the CD playback deck of FIG. 1 with the cover removed.

FIG. 2 is a perspective view of the internal construction of the above-mentioned dual CD player and shows A and B disc compartments 110, 111 in detail. The components of the CD player of FIG. 2 are mounted on horizontal main chassis 13. Each disc compartment 110, 111 is provided with means for holding a disc horizontally in the respective disc compartment. As embodied herein, disc holding means includes disc trays 11 and 12 positioned, respectively, in disc compartments 110 and 111. The CD player of the present invention also is provided with means for independently extending and retracting each of the disc trays out of or into cabinet 100. As embodied herein, the tray extending and retracting means include two separately operable tray transport mechanisms, one for disc tray 11 and one for disc tray 12. Because the two tray transport mechanisms are substantially identical, the following description will deal with the transport mechanism for A-side disc tray 11 only.

Disc tray 11 is mounted on main chassis 13 in such a manner that it can move with respect to main chassis 13 in the directions of arrow M (out of cabinet 100) and arrow N (into of cabinet 100). Disc tray 11 is guided by four guides 14 (only two are shown in FIG. 2) secured to main chassis 13 on the right and left sides of tray 11. The tray transport mechanism includes rack gear 11a formed on one side of disc tray 11 and tray drive motor 15, which is mounted on main chassis 13 and is coupled to rack gear 11a through pulleys 16, 18 connected by belt 17 and a set of gears 19, 20, 21, 22. When disc tray 11 is in its retracted position, as shown in FIG. 2, and A EJECT key 133 (see FIG. 1) is pressed, tray drive motor 15 drives disc tray 11 to slide between guides 14 in the direction of arrow M. When disc tray 11 reaches its foremost extended position, rib 11b, which is mounted on the rear part of the upper surface of disc tray 11, presses leaf switch 23 mounted on main chassis 13 to stop tray drive motor 15. Extended disc tray 11 is retracted into cabinet 100 when A EJECT key 133 is pressed again. During retraction, tray drive motor 15 rotates oppositely and causes disc tray 11 to slide in the direction of arrow N. The fully retracted position of disc tray 11 is detected by an increase in the amount of current drawn by tray drive motor 15.

Each disc compartment 110, 111 includes means for clamping a disc 26 that has been placed in its respective disc tray 11, 12. As embodied herein, disc clamping means includes disc clampers 24 and 25, which are respectively positioned in disc compartments 110 and 111. Disc clampers 24, 25 are arranged so that they can pivot up and down relative to main chassis 13 about a fulcrum O, which is fixed to main chassis 13. Upward pivot biasing is applied to disc clampers 24, 25 by springs 27, 28, which are hooked between the rear portions of disc clampers 24, 25 and main chassis 13. Thus, clampers 24, 25 normally are pivoted upward and do not interfere with the extending and retracting movement of disc trays 11, 12. Disc clampers 24, 25 are pivoted downward by a clamp drive mechanism coupled to a lift drive mechanism of the disc playback module, which will be described below.

Figure 3:
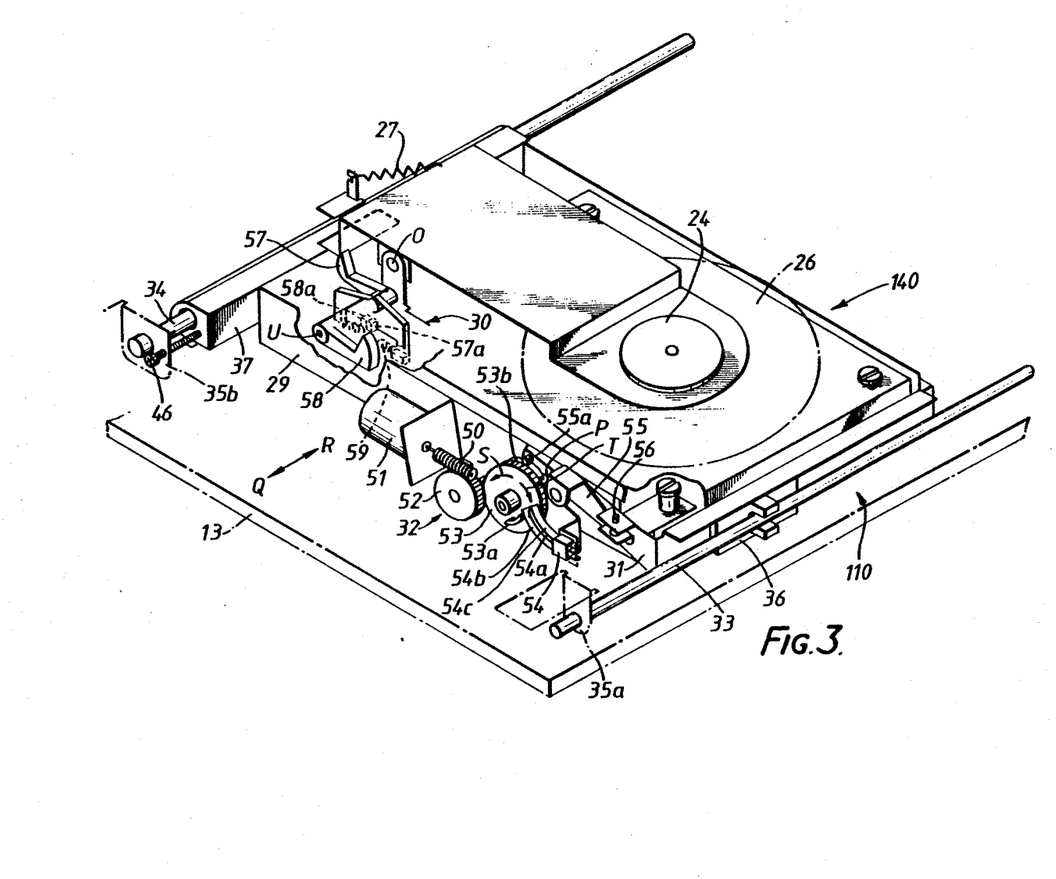
FIG. 3 is a perspective view showing the disc playback module and clamp of the CD playback deck of FIG. 2.

Referring now to FIG. 3, the disc playback module, indicated generally by reference numeral 140, and lifting means for raising and lowering the disc playback module and A-side disc clamper 24 will be described. Disc playback module 140 includes subchassis 29, which is shaped like a rectangular box and is pivotally and laterally slidably mounted on main chassis 13. As embodied herein, the playback module lifting means comprises lift drive mechanism 32, which is mounted on the side of subchassis 29 and includes lift drive motor 51, worm gear 50 fitted on a drive shaft of motor 51, and a set of transmission gears 52, 53. Arcuately shaped rib 53a for actuating leaf switch 54 (to be described below) is formed on the face of gear 53 directed away from subchassis 29, and spiral cam 53b is formed on the face of gear 53 directed toward subchassis 29. Lift arm 55, pivotally mounted on subchassis 29 at fulcrum P, is coupled to pivoted bar 31 through height-adjustment screw 56 (to be described below). Projecting boss 55a which is in sliding contact with spiral cam 53b of gear 53, is formed on the side of one end of lift arm 55. Pivoted bar 31 is mounted across the front of subchassis 29. Mounted to the inside of subchassis 29, with resilient material between them and subchassis 29, are the disc drive motor (not shown), the optical pickup with its drive mechanism (not shown), and clamp drive mechanism 30 (shown in FIG. 3) for pivoting disc clamper 24 downward against the biasing force of spring 27.

Figure 4:
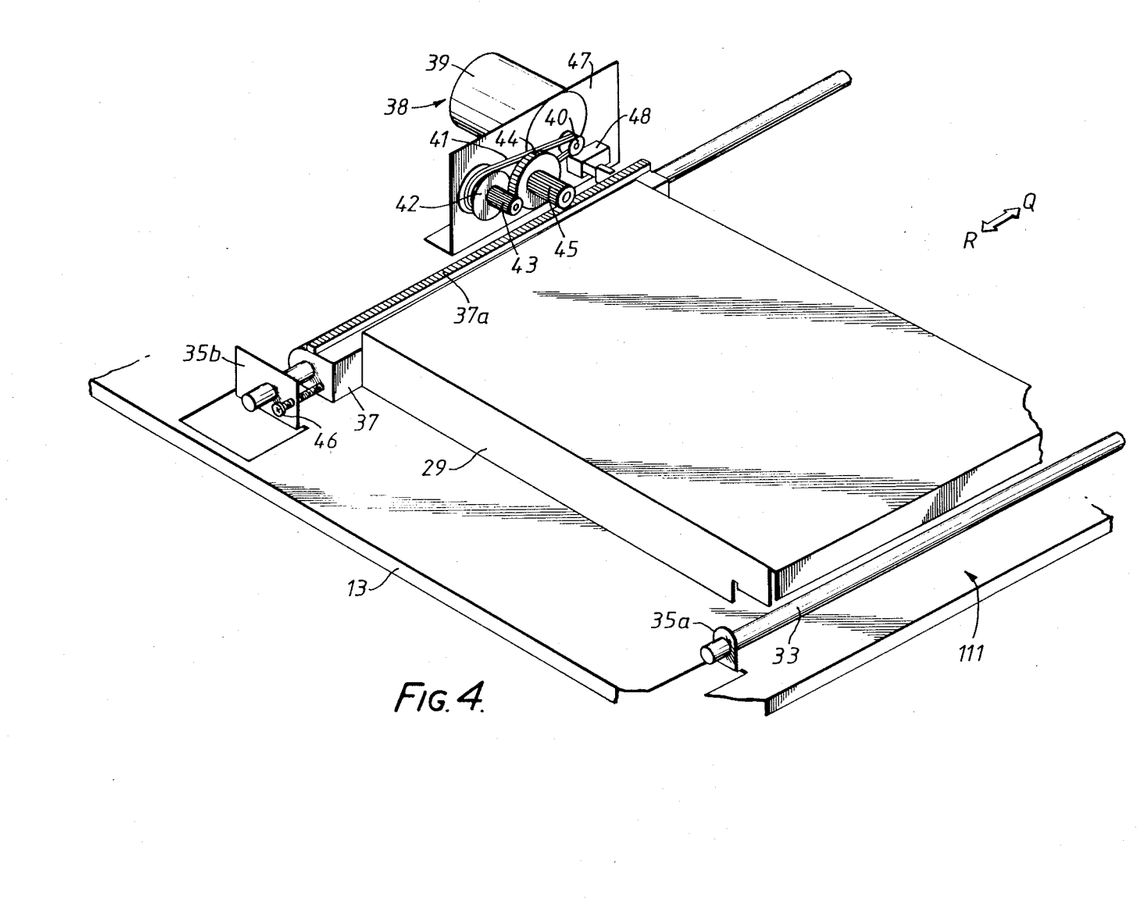
FIG. 4 is a perspective view of the underside of the subchassis traverse drive mechanism of the CD playback deck of FIG. 2.

Referring now to FIGS. 3 and 4, perspective views showing, respectively, the top side of disc compartment 110 when the disc playback module is aligned in the A disc compartment and the underside of disc compartment 111 when the disc playback module is aligned in the B disc compartment, means for transporting disc playback module 140 horizontally between A-side disc compartment 110 and B-side disc compartment 111 and for aligning playback module 140 with either disc compartment will be described. As embodied herein, playback module transport means includes guide rails 33, 34 for guiding subchassis 29 horizontally in the directions of arrows Q and R; first and second sliders 36, 37; and transport drive mechanism 38 mounted on panel 47 fixed to the underside of main chassis 13. Guide rails 33 and 34 respectively are mounted on main chassis 13 by means of two front supports 35a and two rear supports 35b (A-side supports 35a, 35b are shown in FIG. 3, and B-side supports 35a and 35b are shown in FIG. 4) projecting downward from main chassis 13. C-shaped first slider 36 is fixed to pivoted bar 31 at the front of subchassis 29 and slidably engages guide rail 33. Second slider 37 is fixed at the back of subchassis 29 and includes lugs 37b, 37c (see FIG. 5) projecting rearward from its ends and aligned holes formed in the lugs to receive guide rail 34. Thus, subchassis 29 is suspended by first slider 36 engaging with front guide rail 33 and rear guide rail 34 passing through second slider 37.

Transport drive mechanism 38 includes motor 39, pulleys 40, 42 connected by belt 41, and a set of transmission gears 43, 44 45. Gear 45 engages rack gear 37a formed along the underside of second slider 37. Transport drive mechanism 38 transmits the reversible rotation of motor 39 to rack gear 37a on second slider 37 via pulleys 40, 42, belt 41, and transmission gears 43, 44, 45 to drive subchassis 29 horizontally in the directions of arrows Q and R.

Means for aligning playback module 140 with disc compartments 110, 111 by determining the stop end positions of subchassis 29 along the directions Q and R now will be explained. The stop end positions of subchassis 29 are set by means of positivestop adjustment screws 46. Adjustment screws 46 are screwed through rear supports 35b, which support second guide rail 34, the screw tips facing the ends of second slider 37. Motor 39 remains energized after subchassis 29 reaches its stop end position, for example, until subchassis 29 is raised by left drive mechanism 30, so that second slider 37 is pressed against and does not rebound off positive-stop screws 46.

Figures 5, 6A:
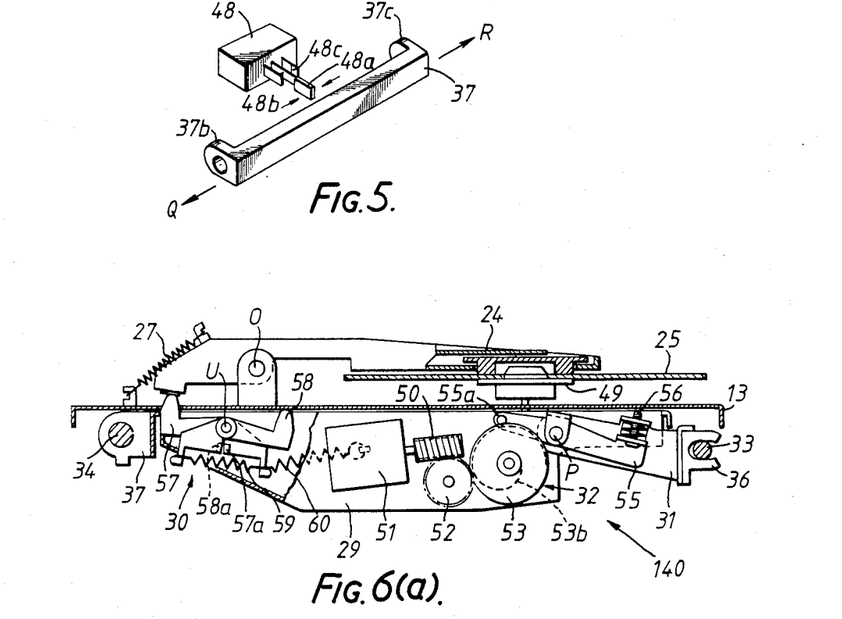
FIG. 5 is a schematic drawing showing the means by which the arrival of the subchassis at a top/bottom position is detected electrically.
FIGS. 6(a) and 6(b) are sectional side elevations showing the lift drive mechanism of the subchassis and the clamp drive mechanism.

Leaf switch 48, for detecting electrically when subchassis 29 has reached either of the stop end positions in the direction of arrows Q, R, is mounted on panel 47, on which transport drive mechanism 38 also is mounted. As shown in FIG. 5, leaf switch 48 has contact points 48b, 48c on either side of leaf 48a. Leaf 48a is positioned at the center of the lateral transport range of second slider 37. When subchassis 29 reaches one of the stop end positions and the inner face of either of projecting lugs 37b, 37c formed at the ends of second slider 37 presses against leaf 48a, leaf 48a is brought into contact with contact point 48b or 48c. Because the stop end positions of subchassis 29 are detected electrically in this way, motor 39 can be de-energized after some prescribed time lag by, for example, a timer control function provided by the control circuit mentioned above.

Figure 6B:
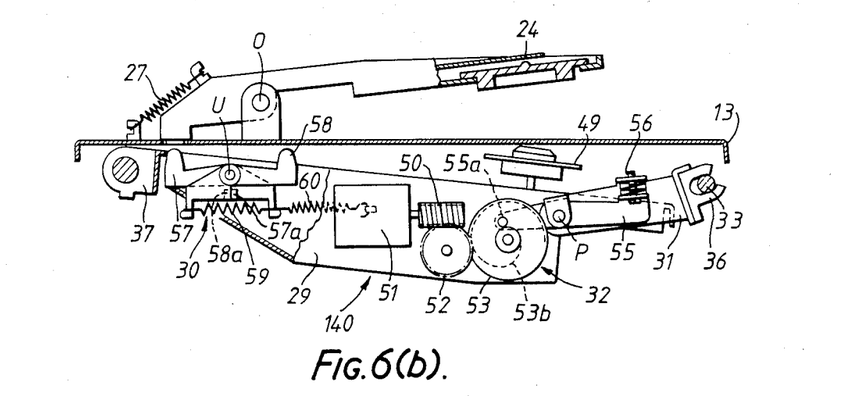

Referring now to FIGS. 6 and 7, lift drive mechanism 32 and linking means for lowering a disc clamper in response to disc playback module 140 being raised by lift drive mechanism 32 will be described in detail. FIGS. 6(a) and 6(b) show side elevations of a cross section taken through subchassis 29 and disc clamper 24. FIG. 6(a) shows the state when turntable 49 is positioned above the level of main chassis 13 by the raising of subchassis 29 while at the same time disc 26 is pressed against turntable 49 by the lowering of disc clamper 24. FIG. 6(b) shows the state when, simultaneously with the raising of disc clamper 24, subchassis 29 is lowered so that turntable 49 is below main chassis 13 in preparation for transporting disc playback module 140 in the horizontal direction.

Lift drive mechanism 32 operates by transmission of the rotation of lift drive motor 51 to gear 53, which causes projecting boss 55a on lift arm 55 to move up or down as it rides on spiral cam 53b of gear 53. Because lift arm 55 is coupled to pivoted bar 31, pivoted bar 31 moves up or down with the movement of projecting boss 55a on lift arm 55, which also pivots about front guide rail 33 through pivoted bar 31. The effect of this is that subchassis 29 and, therefore, playback module 140 are raised or lowered about rear guide rail 34 by the movement of pivoted bar 31 about front guide rail 33.

The highest position to which subchassis 29 can be raised is set by height-adjustment screw 56. When the angle formed at fulcrum P between pivoted bar 31 and lift arm 55 is increased by adjusting height-adjustment screw 56 to raise the position of projecting boss 55a, subchassis 29 is lowered. Conversely, if the angle is reduced and the position of projecting boss 55a is lowered, subchassis 29 is raised. By use of this adjusting means, turntable 49 can be set to be above tray 11 or 12 at the highest position of subchassis 29 and below main chassis 13 at the lowest subchassis position.

The highest and lowest positions of subchassis 29 are detected by leaf switch 54. As shown in FIG. 3, leaf switch 54 has contact points on central leaf 54a, with first and second leaves 54b, 54c on either side of central leaf 54a. As described above, projecting rib 53a is provided on the outward face of gear 53, which is rotatably mounted on the side of subchassis 29. Leaf switch 54 is mounted on main chassis 13 at an appropriate point on the locus of movement of rib 53a. When gear 53 rotates in the S direction of FIG. 3 and subchassis 29 reaches its highest position, one end of rib 53a pushes up on first leaf 54b until it presses against a contact point on leaf 54a. When gear 53 rotates in the T direction in FIG. 3 and subchassis 29 reaches its lowest position, the other end of rib 53a pushes down on second leaf 54c until it presses against a contact point on leaf 54a. Leaf switch 54 and rib 53a are positioned so that leaves 54b and 54c press against contact points on leaf 54c only when subchassis 29 is in its highest and lowest position, respectively. Actuation of leaf switch 54 enables lift drive motor 51 to be de-energized by the control circuit and playback to be initiated when subchassis 29 is raised to its highest position, and enables lift drive motor 51 to be energized by the control circuit and subchassis 29 to be put in readiness for transporting disc playback module 140 to the right or to the left when subchassis 29 is lowered to its lowest position.

As embodied herein, linking means for lowering the disc clamper aligned with disc playback module 140 in response to disc playback module 140 being raised by lift mechanism 32 includes clamp drive mechanism 30. In clamp drive mechanism 30, as shown in FIGS. 3 and 6, clamp lifter 57 and clamp auxiliary lever 58, both crank-shaped, are mounted to pivot about a fulcrum U mounted on subchassis 29. Stops 57a and 58a, which make contact with each other, are formed below fulcrum U on lifter 57 and lever 58, respectively. Lifter 57 and lever 58 are biased by first spring 59 to pivot in the direction in which stops 57a, 58a make contact. In addition, lifter 57 is biased by second spring 60, one end of which is fixed to subchassis 29, to adopt an approximately horizontal position.

Figure 7A:
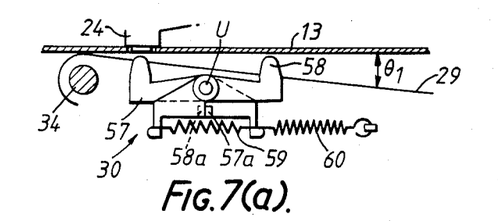
FIGS. 7(a), 7(b), 7(c), and 7(d) are sectional side elevations showing the working of the clamp drive mechanism.
Figure 7B:
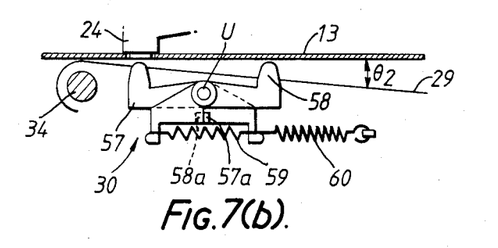
Figure 7C:
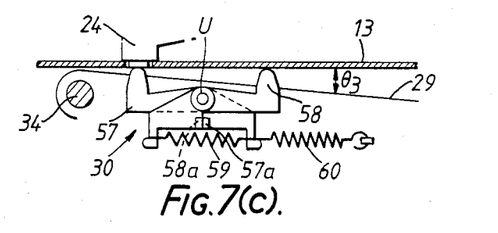
Figure 7D:
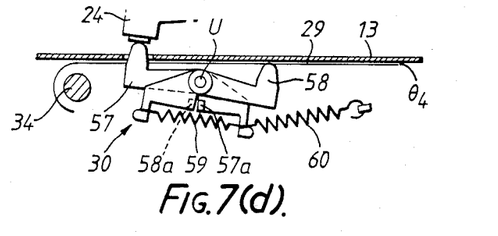

FIGS. 7(a) through 7(d) show the working of clamp drive mechanism 30 as the angle formed by main chassis 13 and subchassis 29 changes from $\theta_1$ through $\theta_4$. When subchassis 29 is in its lowest position and forms angle $\theta_1$ with main chassis 13, the tips of lifter 57 and lever 58 both are positioned below main chassis 13 (FIG. 7(a)). As subchassis 29 rises with the rotation of gear 53, the tip of lever 58 makes contact with main chassis 13 when the angle between main chassis 13 and subchassis 29 equals $\theta_2$ (FIG. 7(b)). As subchassis 29 rises further to form angle $\theta_3$ main chassis 13, lever 58 pushes up lifter 57 via stops 57a, 58a against the tension of second spring 60, with the contact point of the tip with main chassis 13 as a fulcrum, until the tip of lifter 57 comes into contact with the underside of clamper 24 (FIG. 7(c)). As subchassis 29 rises still further, lever 57, overcoming (by virtue of the tension in first spring 59) the tension in spring 27 mentioned above, pushes up the underside of the rearward portion of disc clamper 24 and causes it to pivot about fulcrum O until it clamps disc 26, which has been placed on tray 11, with raised turntable 49. With the further rise of subchassis 29 to form an angle $\theta_4$ with main chassis 13 approximately equal to zero, turntable 49 presses against disc clamper 24 via disc 26, so that the underside of the rearward projection of disc clamper 24 presses lifter 57 down. At this stage, since fulcrum U of lifter 57 is carried on subchassis 29, lifter 57 pivots against the tension in first spring 59, as shown in FIG. 7(d). Disc 26 is securely engaged by this means with turntable 49 and disc clamper 24.

In a dual-disc CD player constructed as described above, trays 11, 12 on the A side and B side can be loaded independently, disc playback module 140 can be transported into alignment with either disc compartment 110, 111, disc playback module 140 can be raised into position to engage with a disc held by either disc tray 11, 12, and the disc clamper positioned in the disc compartment aligned with disc playback module 140 can be moved down or up simultaneously with the oppositely directed movement of the disc playback module to clamp or release the disc to or from disc playback module 140. Thus, the disc player described above permits continuous and sequential playback from discs placed on sides A and B, and selective playback at the user's choice.

As described above, this invention provides, particularly in the field of devices for the playback of discs on which data have been recorded in digital form, a disc record player of simple construction but permitting use of sophisticated control facilities that can be implemented reliably and can contribute thereby to greater convenience for the user.

It will be apparent to those skilled in the art that modifications and variations can be made to the disc player of this invention. In particular, the invention is applicable to a disc player having more than two disc compartments. It also can be used with disc-shaped information storage media other than compact audio discs, for example, with video discs. The invention in its broader aspects is, therefore, not limited to the specific details and illustrated examples shown and described. Accordingly, departure can be made from such details without departing from the spirit of the general inventive concept.

What is claimed:
1. A disc player, comprising:
    a plurality of horizontally spaced disc compartments each including means for holding a disc horizontally in said disc compartment;
    a disc playback module including a turntable for rotating a disc, said disc playback module being horizontally movable between and alignable with said disc compartments for playing a disc held in any of said disc compartments; and
    playback module transport means for transporting said disc playback module horizontally between said disc compartments and for aligning said disc playback module with any of said disc compartments.

2. The disc player of claim 1, wherein each of said disc holding means includes a disc tray capable of holding a disc in said disc compartment.

3. The disc player of claim 2, further comprising means for independently extending and retracting each of said disc trays out of and into its respective disc compartment for loading or unloading discs in said disc compartment.

4. The disc player according to claim 1, wherein said disc holding means hold said discs substantially in the same horizontal plane.

5. The disc player of claim 1, further comprising means for clamping a disc to said turntable of said disc playback module when said disc playback module is aligned with any of said disc compartments.

6. The disc player of claim 5, further comprising playback module lifting means for raising said disc playback module to a playing position where said disc playback module is able to play a disc held in any of said disc compartments and for lowering said disc playback module from said playing position to a position where said disc playback module can move horizontally between compartments.

7. A disc player, comprising:
plurality of horizontally spaced disc compartments each including means for holding a disc horizontally in said disc compartment;
a disc playback module including a turntable for rotating a disc, said disc playback module being horizontally movable between and alignable with said disc compartments for playing a disc held in any of said disc compartments;
playback module transport means for transporting said disc playback module horizontally between said disc compartments and for aligning said disc playback module with any of said disc compartments;
playback module lifting means for raising said disc playback module to a playing position where said disc playback module is able to play a disc held in any of said disc compartment and for lowering said disc playback module from said playing position to a position where said disc playback module can move horizontally between said disc compartments; and
means for clamping a disc held in an individual disc tray to said turntable when said disc playback module is aligned with said individual disc tray, said disc clamping means including a plurality of disc clampers each positioned within an individual disc compartment, said turntable clamping a disc against one of said disc clampers when said playback module is raised to said playing position.

8. The disc player of claim 7, wherein said disc clampers are movable vertically, an individual disc clamper being lowered to clamp a disc against said turntable when said disc playback module is in said playing position.

9. A disc player, comprising:
a. a cabinet including a front panel;
b. a chassis mounted within said cabinet;
c. a plurality of horizontally displaced disc trays slidably mounted on said chassis, each of said trays being capable of holding a disc;
d. means for independently extending and retracting each of said disc trays out of and into said cabinet through said front panel;
e. a disc playback module horizontally movable between and alignable with said disc trays for playing a disc held in any of said disc trays, said disc playback module including a turntable for rotating a disc;
f. playback module transport means for transporting said disc playback module horizontally between said disc trays and for aligning said disc playback module with any of said disc trays; and
g. means for clamping a disc held in an individual disc tray to said turntable when said disc playback module is aligned with said individual disc tray.

10. A disc player, comprising:
a. a plurality of horizontally spaced disc compartments each including means for holding a disc horizontally in said disc compartment;
b. a disc playback module horizontally movable between and alignable with said disc compartments for playing a disc held in any of said disc compartments, said disc playback module including a rotatable turntable;
c. playback module transport means for transporting said disc playback module horizontally between said disc compartments and for aligning said disc playback module with any of said disc compartments;
d. playback module lifting means for raising said disc playback module to a playing position where said disc playback module is able to play a disc held in any of said disc compartments and for lowering said disc playback module from said playing position to a position where said disc playback module can move horizontally between said disc compartments;
e. means for clamping a disc to said turntable of said disc playback module when said disc playback module is aligned with any of said disc compartments, said clamping means including a plurality of vertically movable disc clampers each positioned within an individual disc compartment; and
f. linking means for lowering said disc clamper positioned within said disc compartment aligned with said disc playback module in response to said disc playback module being raised by said playback module lifting means to clamp a disc between said disc clamper and said turntable of said playback module.

* * * * *